US008650268B2

United States Patent
Reeves et al.

(10) Patent No.: US 8,650,268 B2
(45) Date of Patent: Feb. 11, 2014

(54) REMOTELY ASSOCIATING NETWORK PORTS TO A SERVER

(75) Inventors: Matthew S. Reeves, Round Rock, TX (US); Darda Chang, Austin, TX (US); Roland G. Horstman, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1936 days.

(21) Appl. No.: 11/205,709

(22) Filed: Aug. 17, 2005

(65) Prior Publication Data

US 2007/0043880 A1   Feb. 22, 2007

(51) Int. Cl.
G06F 15/177    (2006.01)
G06F 15/173    (2006.01)

(52) U.S. Cl.
USPC ........................ 709/220; 709/221; 709/223

(58) Field of Classification Search
USPC .................................. 709/220, 221, 222, 223
See application file for complete search history.

(56) References Cited

U.S. PATENT DOCUMENTS

| | | | |
|---|---|---|---|
| 4,689,610 A * | 8/1987 | Dietrich ........................ 340/515 |
| 5,943,654 A * | 8/1999 | Goodwin et al. ............... 705/14 |
| 6,009,474 A | 12/1999 | Lu et al. |
| 6,167,403 A * | 12/2000 | Whitmire et al. ............... 707/10 |
| 6,233,604 B1 | 5/2001 | Van Horne et al. |
| 6,331,983 B1 | 12/2001 | Haggerty et al. |
| 6,563,830 B1 | 5/2003 | Gershon et al. |
| 6,833,850 B1 | 12/2004 | Arquie et al. |
| 6,873,603 B1 | 3/2005 | Ivaturi |
| 7,154,407 B2 * | 12/2006 | Sokol et al. ............. 340/815.45 |
| 2002/0069277 A1* | 6/2002 | Caveney ........................ 709/223 |
| 2003/0204611 A1* | 10/2003 | McCosh et al. ............... 709/230 |
| 2005/0149658 A1* | 7/2005 | Martin et al. .................. 710/302 |

* cited by examiner

Primary Examiner — Brian J Gillis

(57) ABSTRACT

An implementation of an apparatus in one example may have: a network component, coupled with a communication network, having a plurality of network ports and a plurality of visual indicators that correspond respectively to the plurality of network ports; and a message received over the communication network by the network component, wherein the network component triggers a respective visual indicator, of the plurality of visual indicators, that corresponds to a selected port, of the plurality of network ports, based on the message received over the communication network.

25 Claims, 4 Drawing Sheets

FRAME STRUCTURE: ← 201
TLV: TYPE LENGTH VALUE

| OCTETS | FIELD NAME | FIELD DESCRIPTION |
|---|---|---|
| 6 | DESTINATION ADDRESS | MULTICAST CONFIGURATION ADDRESS |
| 6 | SOURCE ADDRESS | PORT MAC ADDRESS |
| 2 | LENGTH /TYPE | xx-xx (CONFIGURATION TYPE) |
| 1 | VERSION NUMBER | 1 |
| 1 | TLV TYPE | |
| 1 | LENGTH | n (THE NUMBER OF BYTES FOLLOWED) |
| n | . . . | |
| 4 | FCS | FRAME CHECK SUM |

TLV TYPE FIELDS: ← 202
REMOTE UID

| 1 | TLV TYPE | 1=REMOTE UID |
|---|---|---|
| 1 | LENGTH | 9=REMOTE UID INFORMATION LENGTH |
| 6 | SYSTEM ID | SENDER'S SYSTEM ID |
| 1 | UID REQUEST/REPLY | REQUEST:<br>  0=STOP BLINKING<br>  1=START BLINKING<br>REPLY:<br>  WHEN STATUS IS OK,<br>  2=STOP BLINKING COMPLETE<br>  3=START BLINKING COMPLETE |
| 1 | STATUS | 0=OK<br>1=CAN NOT START BLINKING<br>2=CAN NOT STOP BLINKING<br>3=INVALID BLINKING RATE (OUT OF RANGE) |
| 1 | BLINKING RATE: THE NUMBER OF BLINKS | THE NUMBER OF BLINKS |
| 1 | BLINKING RATE: WITHIN THE NUMBER OF SECONDS | PER THE NUMBER OF SECONDS |

TERMINATOR ← 203

| 1 | TLV TYPE | 0=TERMINATOR |
|---|---|---|
| 1 | LENGTH | 0 |

FIG. 2

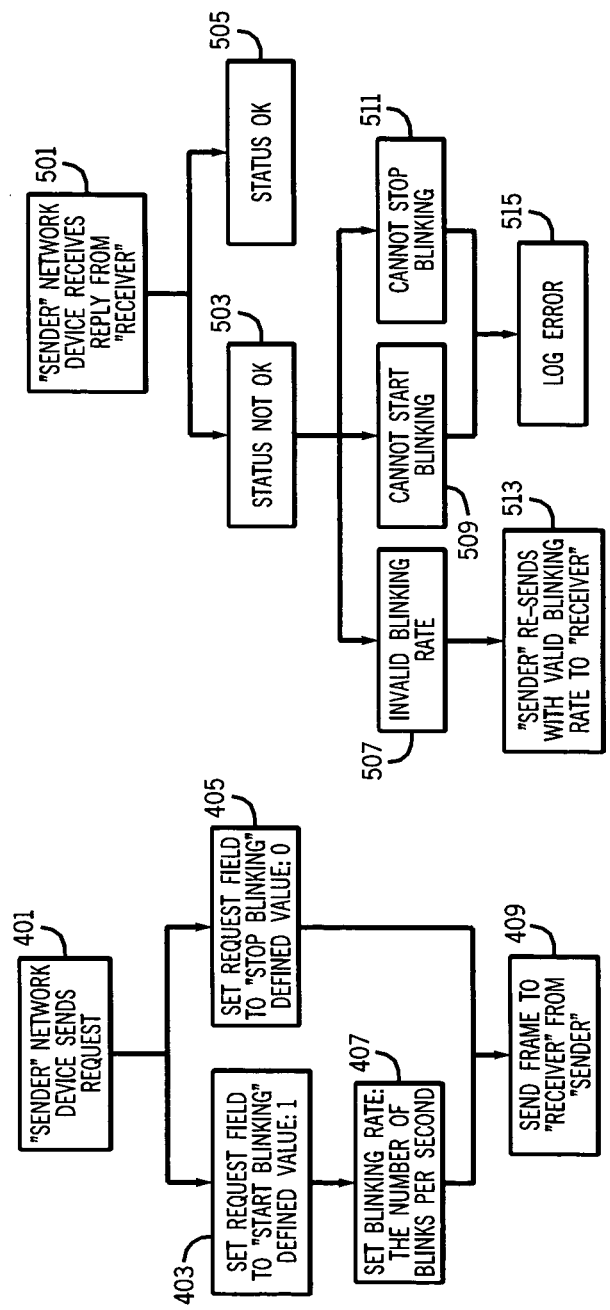

REMOTELY ASSOCIATING NETWORK PORTS TO A SERVER

BACKGROUND

Network components, such as servers, switches, and routers, are often placed closely together in network operations rooms. The network components comprise network ports that are communicatively coupled with cable, wire, or optical fiber. When performing network maintenance, a network technician in one example needs to determine which network components are coupled with each other. In one example, the network technician maintains a list of the network ports and their connections and labels each network port. In another example, the network component comprises a button that causes a light emitting diode ("LED") on the network component to blink. For example, the network technician presses the button on the front of a selected server in a rack of servers which causes an LED on the rear of the selected server to blink. The network technician then moves behind the rack of servers and looks for the blinking LED to distinguish the server.

UID (unique identifier) blink is used to identify network adapters within a server or to identify the server itself. This identification cannot, currently, be done remotely, however, to identify which port a network adapter on the server is plugged into. Administrators must label network cables or follow them to identify problems in the network. Unfortunately, the administrators cannot easily locate a port on a network device when it is located in a separate room or office. Typically, they are able to identify connections only by keeping complex cable diagrams or labeling cables.

SUMMARY

The invention in one implementation encompasses an apparatus. The apparatus comprises: a network component, coupled with a communication network, having a plurality of network ports and a plurality of visual indicators that correspond respectively to the plurality of network ports; and a message received over the communication network by the network component, wherein the network component triggers a respective visual indicator, of the plurality of visual indicators, that corresponds to a selected port, of the plurality of network ports, based on the message received over the communication network.

Another implementation of the invention encompasses a method. In this embodiment the method may comprise: receiving a request in a frame at a receiver network device from a sender network device; determining if the request is for one of start blinking or stop blinking; and sending a reply, indicative of a response of the receiver network device to the request, from the receiver network device to the sender network device.

DESCRIPTION OF THE DRAWINGS

Features of exemplary implementations of the invention will become apparent from the description, the claims, and the accompanying drawings in which:

FIG. 2 is a representation of one exemplary implementation of a frame structure, TLV (Type, Length, Value) type fields, and a terminator for use with the apparatus of FIG. 1.

FIG. 4 is a representation of an implementation of a method for sending a request from of a sender network device or component according to the present method and apparatus.

FIG. 5 is a representation of an implementation of a method for receiving a reply from a receiver network device or component according to the present method and apparatus.

DETAILED DESCRIPTION

Referring to the BACKGROUND section above, it is a drawback of the known art that locating which port on a network device is connected to a particular network adapter on a server is a complex and time consuming process. The network device may also be referred to as a network component or a client. The client/server may describe the relationship between two computer programs in which one program, the client, makes a service request from another program, the server, which fulfills the request. Although the client/server concept may be used by programs within a single computer, it is a more important idea in a network. In a network, the client/server model may provide a convenient way to interconnect programs that are distributed efficiently across different locations.

One method of communication is to use a TLV (Type, Length, Value) format. The following is one example of a TLV format. The type field describes which kind of value is inside the TLV. The length field contains the unsigned length of the whole TLV structure measured in octets. The value field contains encoded data. Other communication procedures and formats may be used with the present method and apparatus.

Network devices and servers may communicate using the concept of multicast. Multicast is a receiver-based concept: receivers join a particular multicast session group and traffic is delivered to all members of that group. The sender does not need to maintain a list of receivers. Only one copy of a multicast message will pass over any link in the network, and copies of the message will be made only where paths diverge at a router. In this way, IP multicasting, for example, yields performance improvements and conserves bandwidth end-to-end.

Implementations according to the present method and apparatus provide for uniquely identifying connections between network devices and servers through UID blinking. In one implementation network devices or components will recognize a remote UID frame to configure the UID blinking.

Figure 1:
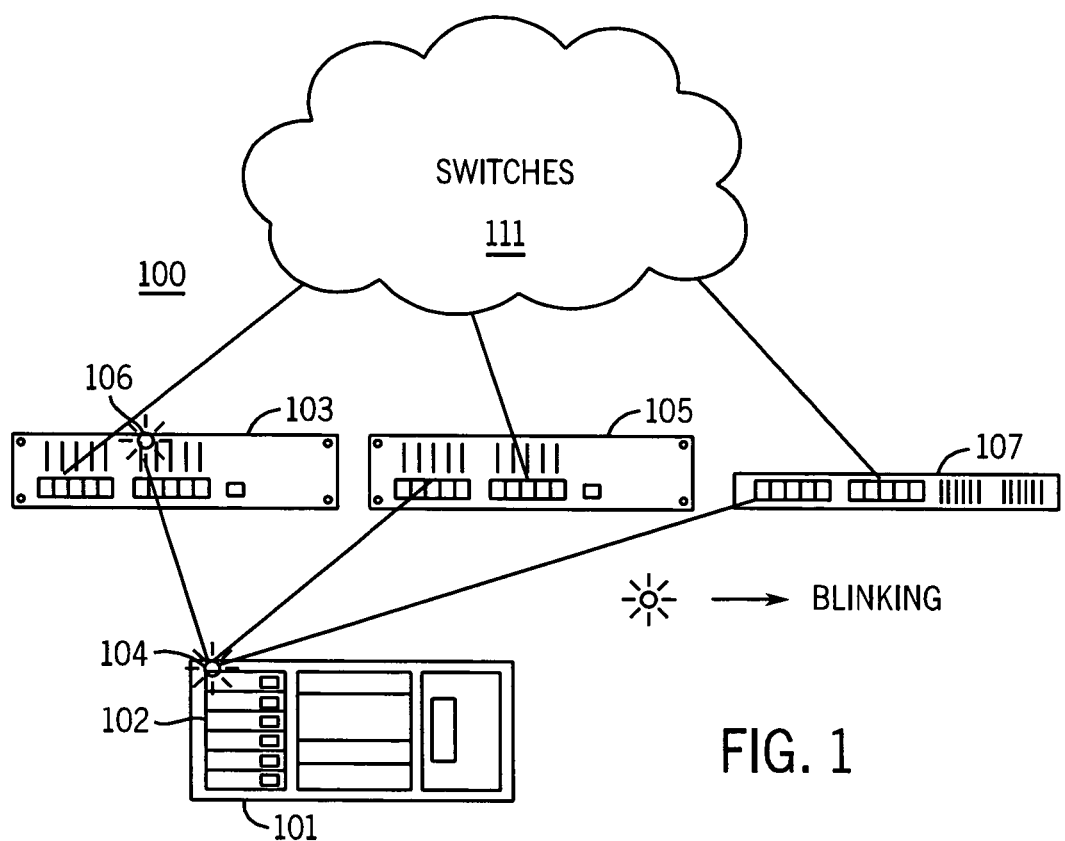
FIG. 1 is a representation of one implementation of an apparatus for locating which port on a network device is connected to a particular network adapter on the server.

FIG. 1 is a representation of one implementation of an apparatus for locating which port on a network device is connected to a particular network adapter on the server. In FIG. 1, an apparatus 100 in one example has a communication network of switches 111 that may be operatively coupled to network devices 103, 105, 107. Each of the network devices 103, 105, 107 may be operatively coupled to respective network adapters 102 in a server 101.

Each of the network adapters may have at least one visual indicator 104 per port for both lines, such as an LED. Also, each of the network devices 103, 105, 107 may have at least one visual indicator per port for both lines, such as visual indicator 106 an network device 103.

Implementations of the present method and apparatus allow identification of the port on the network device that has been connected to the server. From either end (network device end or server end), a sender may send out a "request remote UID frame" to start UID blinking with a predetermined blinking rate (a default may be 1 blink per second). Using multiple blink rates allows administrators to uniquely identify multiple connections.

If the receiver accepts the frame, it will carry out the request and reply back with the frame with appropriate status. Failed statuses will result in events being logged on the server to describe the details of the failure. The failures may include that the desired blink rate is not supported, the UID blink cannot be started, or the UID blink cannot be stopped.

The network device with Remote UID feature may stop blinking when there is no link. The frame may initiate the following operations on network devices: start UID blinking on a network device with the specified blink rate; and stop UID blinking on a network device.

FIG. 2 is a representation of one exemplary of a frame structure 201, TLV (Type, Length, Value) type fields 202, and a terminator 203 for use with the apparatus of FIG. 1.

Figure 3:
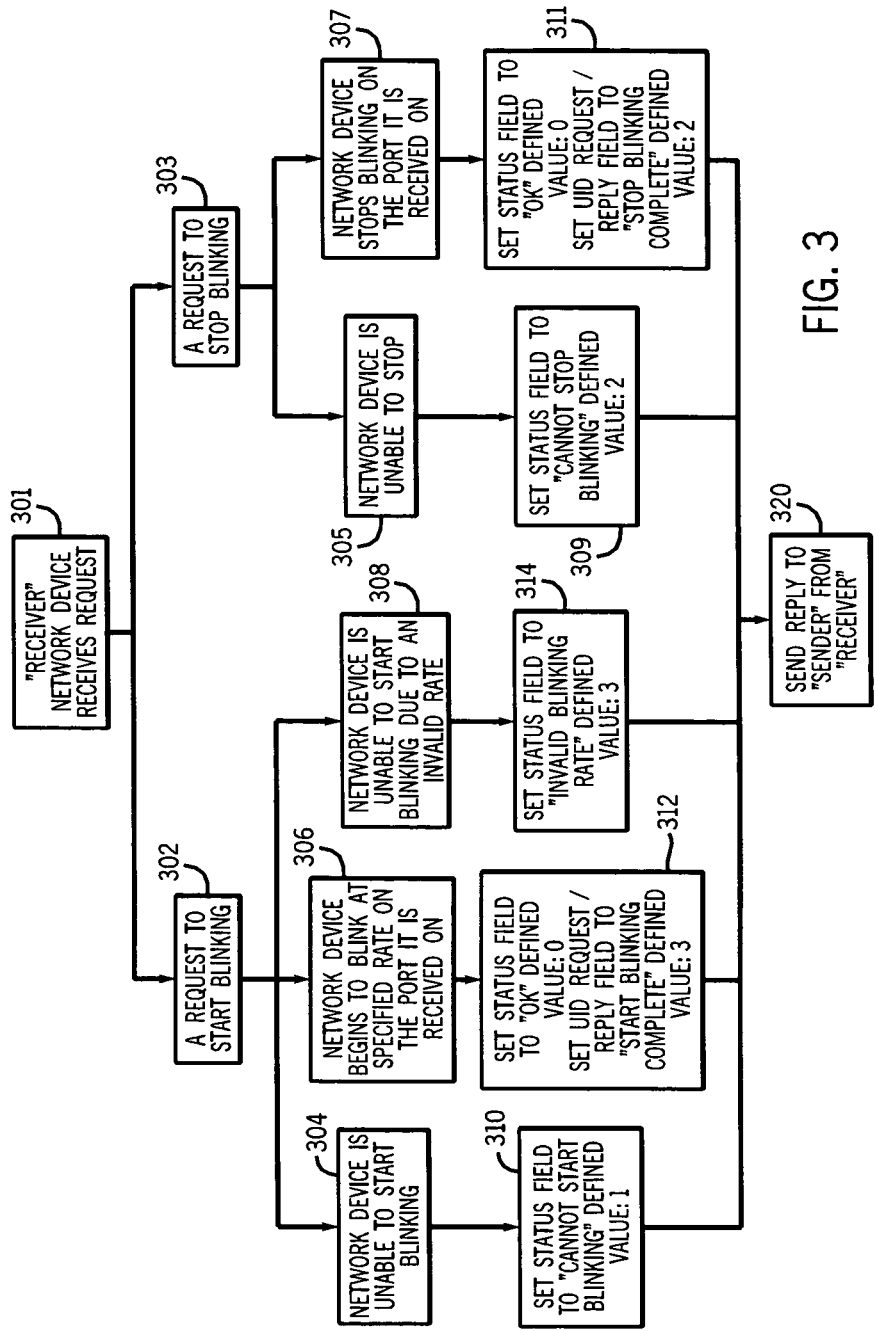
FIG. 3 is a representation of an implementation of a method for handling a request received at a receiver network device or component according to the present method and apparatus.

FIG. 3 is a representation of an implementation of a method for handling a request received at a receiver network device or component according to the present method and apparatus. This implementation may have the following steps: receiving a request in a frame at a receiver network device from a sender network device (301); determining if the request is for one of start blinking or stop blinking (302, 303); and sending a reply, indicative of a response of the receiver network device to the request, from the receiver network device to the sender network device (320).

If the request is to start blinking, the method may have the following: receiving, on a respective port of the receiver network device (301), a request to start blinking (302); setting, if the receiver network device is unable to start blinking (304), a status field to a "cannot start blinking" (310); setting, if the receiver network device begins blinking at a predetermined rate on the respective port (306), a status field to an "OK" (312); setting, if the receiver network device is unable to start blinking due to an invalid blinking rate (308), a status field to a "invalid blinking rate" (314); and sending a reply from the receiver network device to the sender network device (320).

If the status field is set to a "cannot start blinking", a defined value in the frame is set to 1. If the status field is set to "OK", a defined value in the frame is set to 0. If the status field is set to "OK", a defined value in the frame is set to 0, and a UID request/reply field is set to "start blinking complete" that is a defined value of 3. If the status field is set to "invalid blinking rate", a defined value in the frame is set to 3.

If the request is to stop blinking, the method may have the following: receiving, on a respective port of a receiver network device (301), a request to stop blinking (303); setting, if the receiver network device is unable to stop blinking (305), a status field to a "cannot stop blinking" (309); setting, if the receiver network device stops blinking at a predetermined rate on the respective port (307), a status field to an "OK" (311); and sending a reply from the receiver network device to the sender network device (320).

If the status field is set to "cannot stop blinking", a defined value in the frame is set to 2. If the status field is set to "OK", a defined value in the frame is set to 0, and a UID request/reply field is set to "stop blinking complete" that is a defined value of 2.

FIG. 4 is a representation of an implementation of a method for sending a request from of a sender network device or component according to the present method and apparatus. This implementation may have the following steps: setting a request field in a frame (401) to one of "start blinking" (403) and "stop blinking" (405); setting, if the request field is set to "start blinking" (403), a blinking rate value in the frame to a predetermined value (407); and sending, the frame from the sender network device to the receiver network device (408).

FIG. 5 is a representation of an implementation of a method for receiving a reply from a receiver network device or component according to the present method and apparatus. This implementation may have the following steps: receiving a reply at the sender network device from the receiver network device (501); checking a status field in the reply (503, 505); checking for an "invalid blinking rate" (507) if the status field is set to a "status not OK"; checking for a "cannot start blinking" (509) if the status field is set to a "status not OK"; and checking for a "cannot stop blinking" (511) if the status field is set to a "status not OK". When the status field is "status not OK" and there is an invalid blinking rate, the sender network device resets a blinking rate value in the frame and resends the frame to the receiver network device (513). When the status field is one of "cannot start blinking" and "cannot stop blinking", the sender network device logs an error (515).

It is to be understood that the use of phrases, such as "cannot start blinking", "OK", and "invalid blinking rate", may be replace by other parameters, such as numerical values, codes, etc.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified. Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
 a network component, coupled with a communication network, having a plurality of network ports and a plurality of visual indicators that correspond respectively to the plurality of network ports; and
 a server comprising a plurality of network adaptors, wherein the server is configured to send a blinking message over the communication network to the network component, wherein the network component triggers a respective visual indicator, of the plurality of visual indicators, that corresponds to a selected port, of the plurality of network ports, to start blinking based on the blinking message, wherein the blinking identifies the selected port as being coupled to one of the plurality of network adaptors on the server;
 wherein the blinking message has at least one parameter, comprising a request to start blinking and a blinking rate, or a request to stop blinking;
 wherein the network component employs the at least one parameter to trigger the visual indicator that corresponds to the selected port;
 wherein, if the at least one parameter comprises a request to start blinking, the network component attempts to start a blinking action of the visual indicator that corresponds to the selected port at the blinking rate indicated in the parameter; and wherein, if the at least one parameter comprises a request to stop blinking, the network component attempts to stop a blinking action of the visual indicator that corresponds to the selected port.

2. The apparatus of claim 1, wherein each of the plurality of network adaptors of the server comprises a visual indicator, and the visual indicator of the network adaptor that is coupled to the selected port is set to blinking.

3. The apparatus of claim 2, wherein the start-blinking message has an identifier that corresponds to the selected port; and wherein the network component employs the identifier to trigger the respective visual indicator that corresponds to the selected port.

4. The apparatus of claim 3, wherein the plurality of visual indicators is a plurality of LEDs (light emitting diodes); and wherein the network component employs the identifier of the selected port to cause at least one LED of the plurality of LEDs that corresponds to the selected port to blink.

5. The apparatus of claim 4, wherein the at least one LED of the plurality of LEDs comprise a link LED and an activity LED; and wherein the network component causes the link LED and the activity LED to blink simultaneously to visibly distinguish the selected port from other ports of the plurality of network ports.

6. The apparatus of claim 4, wherein the plurality of LEDs comprise a plurality of dedicated unit identification LEDs; and wherein the network component causes a respective dedicated unit identification LED, of the plurality of dedicated unit identification LEDs, that corresponds to the selected port to blink.

7. The apparatus of claim 1, wherein the network component replies to the start-blinking message with a status of the request to start or stop blinking.

8. The apparatus of claim 1, wherein at least one of the plurality of network ports is coupled with the communication network; and wherein the network component receives the start-blinking message through employment of one of the plurality of network ports.

9. The apparatus of claim 1, wherein the start-blinking message comprises a destination address; and wherein the destination address comprises a multicast configuration address that corresponds to the network component.

10. The apparatus of claim 1, wherein the network component comprises at least one of a network switch, network router, and network bridge.

11. An apparatus, comprising:
a first network component and a second network component coupled with a communication network, the first network component being remotely located from the second network component wherein the first network component comprises a network adaptor located in a server; and the second network component having a plurality of network ports and a plurality of LEDs (light emitting diodes) that respectively correspond to the plurality of network ports, at least one of the plurality of network ports coupled with the communication network;

the first network component to send a message to the second network component to controls UID (unit identification) blinking, wherein the UID blinking identifies the at least one of the plurality of network ports on the second network component as being coupled to the first network component;

wherein the message has at least one parameter, comprising a request to start blinking and a blinking rate, or a request to stop blinking;

wherein the second network component employs the at least one parameter to trigger the LED that corresponds to the identified port;

wherein, if the at least one parameter comprises a request to start blinking, the second network component attempts to start a blinking action of the LED that corresponds to the identified port at the blinking rate indicated in the parameter;

wherein, if the at least one parameter comprises a request to stop blinking, the second network component attempts to stop a blinking action of the LED that corresponds to the identified port.

12. The apparatus of claim 11, wherein the first network component sends a message over the communication network to the second network component to trigger a respective LED of the plurality of LEDs that corresponds to a selected port of the plurality of network ports.

13. A method comprising:
receiving a request in a frame at a receiver network device from a sender network device;

determining if the request is for one of start blinking at a selected rate or stop blinking; and sending a reply, indicative of a response of the receiver network device to the request to start blinking or stop blinking, from the receiver network device to the sender network device, wherein the blinking identifies a selected port of the receiver network device as being connected to the sender network device;

wherein the receiver network device employs the request to trigger a visual indicator that corresponds to the selected port;

wherein, if the request is to start blinking, the receiver network device attempts to start a blinking action of the visual indicator that corresponds to the selected port at the selected rate; and wherein, if the request is to stop blinking, the receiver network device attempts to stop a blinking action of the visual indicator that corresponds to the selected port.

14. The method according to claim 13, wherein the method further comprises:

receiving, on a respective port of the receiver network device, a request to start blinking;

setting, if the receiver network device is unable to start blinking, a status field to a "cannot start blinking";

setting if the receiver network device begins blinking at a predetermined rate on the respective port, a status field to an "OK";

setting, if the receiver network device is unable to start blinking due to an invalid blinking rate, a status field to a "invalid blinking rate"; and sending a reply from the receiver network device to the sender network device.

15. The method according to claim 14, wherein, if the status field is set to a "cannot start blinking", a defined value in the frame is set to 1.

16. The method according to claim 14, wherein, if the status field is set to "OK", a defined value in the frame is set to 0.

17. The method according to claim 14, wherein, if the status field is set to "OK", a defined value in the frame is set to 0, and wherein a UID request/reply field is set to "start blinking complete" that is a defined value of 3.

18. The method according to claim 14, wherein, if the status field is set to "invalid blinking rate", a defined value in the frame is set to 3.

19. The method according to claim 13, wherein the method further comprises:
    receiving, on a respective port of a receiver network device, a request to stop blinking;
    setting, if the receiver network device is unable to stop blinking, a status field to a "cannot stop blinking";
    setting, if the receiver network device stops blinking at a predetermined rate on the respective port, a status field to an "OK"; and
    sending a reply from the receiver network device to the sender network device.

20. The method according to claim 19, wherein, if the status field is set to "cannot stop blinking", a defined value in the frame is set to 2.

21. The method according to claim 19, wherein, if the status field is set to "OK", a defined value in the frame is set to 0, and wherein a UID request/reply field is set to "stop blinking complete" that is a defined value of 2.

22. The method according to claim 13, wherein the method further comprises:
    setting a request field in a frame to one of "start blinking" and "stop blinking";
    setting, if the request field is set to "start blinking", a blinking rate value in the frame to a predetermined value; and
    sending, the frame from the sender network device to the receiver network device.

23. The method according to claim 13, wherein the method further comprises:
    receiving a reply at the sender network device from the receiver network device;
    checking a status field in the reply;
    checking for an "invalid blinking rate" if the status field is set to a "status not OK";
    checking for a "cannot start blinking" if the status field is set to a "status not OK"; and
    checking for a "cannot stop blinking" if the status field is set to a "status not OK".

24. The method according to claim 23, wherein, when the status field is "status not OK" and there is an invalid blinking rate, the sender network device resets a blinking rate value in the frame and resends the frame to the receiver network device.

25. The method according to claim 23, wherein, when the status field is one of "cannot start blinking" and "cannot stop blinking", the sender network device logs an error.

* * * * *

UNITED STATES PATENT AND TRADEMARK OFFICE
CERTIFICATE OF CORRECTION

Page 1 of 1

PATENT NO.         : 8,650,268 B2
APPLICATION NO.    : 11/205709
DATED              : February 11, 2014
INVENTOR(S)        : Matthew S. Reeves et al.

It is certified that error appears in the above-identified patent and that said Letters Patent is hereby corrected as shown below:

In The Claims

In column 4, line 66, in Claim 1, delete "if" and insert -- when --, therefor.

In column 5, line 4, in Claim 1, delete "if" and insert -- when --, therefor.

In column 5, line 67, in Claim 11, delete "controls" and insert -- control --, therefor.

In column 6, line 11, in Claim 11, delete "if" and insert -- when --, therefor.

In column 6, line 16, in Claim 11, delete "if" and insert -- when --, therefor.

In column 6, line 39, in Claim 13, delete "if" and insert -- when --, therefor.

In column 6, line 43, in Claim 13, delete "if" and insert -- when --, therefor.

In column 6, line 52, in Claim 14, delete "setting" and insert -- setting, --, therefor.

Signed and Sealed this
Third Day of February, 2015

Michelle K. Lee
*Deputy Director of the United States Patent and Trademark Office*